3,005,000
BETA-CHLOROETHYL DIPHENYLPHOSPHINITE AND METHOD OF PRODUCING SAME

Robert S. Cooper, Park Forest, Ill., assignor to Stauffer Chemical Company, New York, N.Y., a corporation of Delaware
No Drawing. Filed July 7, 1960, Ser. No. 41,252
3 Claims. (Cl. 260—461)

This invention relates to a new compound, beta-chloroethyl diphenylphosphinite and a method for its production.

It has been found that the beta-chloroethyl diphenylphosphinite ester of this invention is quite useful as an antioxidant and stabilizer for vinyl chloride plastisol resins, and as a valuable intermediate for the production of beta-chloroethyl diphenylphosphine oxide and vinyl diphenylphosphine oxide which is useful for the production of resinous polymers and copolymers having desirable flame-resistant characteristics.

The beta-chloroethyl diphenylphosphinite of this invention may be suitably prepared by reacting diphenylphosphinous chloride with ethylene oxide substantially in accordance with the following equation:

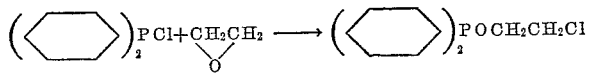

In a typical example the addition reaction was carried out in the following manner. Three moles of diphenylphosphinous chloride was placed in a reaction flask equipped with means for externally cooling the reaction mixture and means for bubbling ethylene oxide vapor into the liquid reaction mixture. Ethylene oxide vapor was bubbled into the reaction mixture until there was no further evidence of an exothermic reaction. The temperature of the reacting mixture was maintained within the range of 25°–40° C. by external cooling of the reaction flask. Approximately 100% excess of ethylene oxide was employed in this example, though such large excess is not essential for completion of the reaction. The reaction mixture was then warmed up to about 50° C. and the excess ethylene oxide stripped off at 2 mm. Hg pressure leaving a water-white liquid beta-chloroethyl diphenylphosphinite product in a 99% yield. The product had an index of refraction of $N_{25}D=1.6203$ and a phosphorous content of 11.8% (theory=11.7%).

The beta-chloroethyl diphenylphosphinate compound has utility as a heat stabilizer for vinyl chloride resin plastisol compositions. For example, 40 parts of Vinylite QYNV (a commercial vinylchloride-vinyl acetate resin) and 20 parts of a plasticizer (dioctyl phthalate) and various amounts of beta-chloroethyl diphenylphosphinite, as a stabilizer, were milled together to form a homogenous paste. After deaeration under vacuum, this paste was placed in 6 cm. diameter aluminum dishes and then cured at 180°±10° in a muffle furnace for various periods of time and the degree of discoloration determined in accordance with the color scale:

0=water white
1=off water white to straw
2=light yellow
3=dark yellow to light amber
4=amber to orange
5=very dark amber to brown
6=black Results obtained in the above examples are shown in the following table:

| Curing Time | Percent Stabilizer | Color Development |
|---|---|---|
| 15 min | 0 | 2 |
| 45 min | 0 | 5 |
| 15 min | 2 | 1 |
| 45 min | 2 | 3 |
| 15 min | 5 | 1 |
| 45 min | 5 | 2 |

These examples show a very definite stabilization against discoloration of plastisol resins on heat curing when beta-chloroethyl diphenylphosphinate is used as a stabilizer in amounts as low as 2 to 5% based on the amount of the vinylite resin employed.

The beta-chloroethyl diphenylphosphinite compound is also a valuable intermediate for the preparation of vinyl diphenyl phosphine oxide which is useful in the production of flame-resistant polymers and copolymers with a number of copolymerizable materials. For example, in the preparation of vinyl diphenylphosphine oxide, 2.26 moles of beta-chloroethyl diphenylphosphinite from the above example was placed in a one liter flask fitted with Tru-Bore vacuum stirrer, thermometer and distilling head. The contents of the flask were heated to 130° C. at 3–5 mm. Hg. pressure when an exothermic reaction began. The temperature was held at 140°–150° C. for 10 minutes, then at 150°–155° C. by external cooling means. As the temperature began to drop the reaction mixture was heated to maintain the temperature within the range of 150°–160° C. for about 2 hours. The reaction under these conditions resulted in the isomerization of the beta-chloroethyl diphenylphosphinite to beta-chloroethyl diphenylphosphine oxide and conversion of the trivalent phosphorous to its pentavalent state. The beta-chloroethyl diphenylphosphine oxide was then dehydrochlorinated by heating to a temperature of about 195° at 1 mm. pressure when the pressure suddenly increased and hydrogen chloride began to be profusely evolved. Heating was required to maintain the dehydrochlorination reaction. The dehydrochlorination was completed in about 2 hours and the pressure again dropped to about 1.5 mm. Hg. On further heating at 197°–202° C. at 1–1.5 mm. pressure vinyl diphenylphosphine oxide distilled over in a 79% yield and was condensed as a white crystalline product. On recrystallization from acetone a hard white crystalline vinyl diphenylphosphine oxide was obtained having a melting point of 118°–119° C. Analysis showed 13.5% P (theory=13.6%) and an olefin bond equivalent 98% of theory.

Ten gram portions of the above vinyl diphenylphosphine oxide were fused together with 0.2 to 0.5 gram of di tertiarybutyl peroxide as a polymerization catalyst, and cured at 150°–155° C. for 4 hours and at 165°–170° C. for 16 hours. The resulting homopolymer resins were hard, brittle, clear amber colored solids having a self-extinguishing character when tested with a lighted match.

Useful copolymer resin compositions were made by copolymerizing vinyl diphenylphosphine oxide with various commercial resinous materials containing ethylenic linkages. For example, monomeric styrene was mixed with 10% to 30% of the above vinyl diphenylphosphine oxide and the mixtures copolymerized in the presence of 0.08% to 0.7% of di tertiarybutyl peroxide by heating the mixtures at 110° C. for 8 hours and 20 hours at 150° C. The resulting copolymers were clear, hard, tough resin products. Those containing 15% or more of the vinyl diphenylphosphine oxide were self-extinguishing when an applied flame was removed.

The above description is given for clearness of understanding only and no unnecessary limitations should be derived therefrom.

I claim:
1. Beta-chloroethyl diphenylphosphinite.
2. Method of producing beta-chloroethyl diphenylphosphinite which comprises reacting diphenylphosphinous chloride with at least a stoichiometric amount of ethylene oxide while maintaining the reaction temperature at not over about 50° C.
3. Method of producing beta-chloroethyl diphenylphosphinite which comprises passing gaseous ethylene oxide into liquid diphenylphosphinous chloride until the addition reaction is completed, while maintaining the reaction temperature at less than about 50° C. and then removing the excess ethylene oxide under vacuum.

No references cited.